(12) United States Patent
Zhou et al.

(10) Patent No.: US 11,260,690 B2
(45) Date of Patent: Mar. 1, 2022

(54) WHEEL SPEED SENSOR ASSEMBLY WITH STEPPED ALIGNMENT KEY

(71) Applicant: Bendix Commercial Vehicle Systems LLC, Elyria, OH (US)

(72) Inventors: Nianqing Zhou, Avon, OH (US); Alexander J. Augoustidis, Avon Lake, OH (US); Anthony J. Cydzik, LaGrange, OH (US); David W. Howell, Oak Ridge, NC (US); Pravin Jawarikar, Bhosari Pradhikaran (IN); Amadeus Mlynarski, Munich (DE); Tobias Rohse, Schwieberdingen (DE)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 177 days.

(21) Appl. No.: 16/835,720

(22) Filed: Mar. 31, 2020

(65) Prior Publication Data
US 2021/0300111 A1 Sep. 30, 2021

(51) Int. Cl.
*G01P 1/02* (2006.01)
*B60B 27/00* (2006.01)
*G01P 3/44* (2006.01)

(52) U.S. Cl.
CPC .......... *B60B 27/0068* (2013.01); *G01P 1/026* (2013.01); *B60B 2320/50* (2013.01); *G01P 3/44* (2013.01)

(58) Field of Classification Search
CPC . B60B 27/0068; B60B 2320/50; G01P 1/026; G01P 3/44
See application file for complete search history.

(56) References Cited

U.S. PATENT DOCUMENTS 3,944,864 A 3/1976 Jovick
4,285,305 A 8/1981 Kaufman et al.
(Continued)

FOREIGN PATENT DOCUMENTS

DE 698 15 739 T2 4/2004
DE 10 2013 010 925 A1 1/2015
(Continued)

OTHER PUBLICATIONS

English (machine) translation of DE 698 15 739 T2.
English (machine) translation of DE10 2013 010 925 A1.
English (machine) translation of DE10 2017 113 604 A1.

*Primary Examiner* — Freddie Kirkland, III
(74) *Attorney, Agent, or Firm* — Reising Ethington P.C.

(57) ABSTRACT

A wheel speed sensor assembly includes a sensor having a housing configured to be received within a bore in a mounting block such that the sensor is spaced from, and faces, an exciter ring and senses rotation of the exciter ring. The housing extends along a longitudinal axis and defines a key on a radially outer surface having first and second portions having different heights. The first portion is configured to be received within a first keyway that is formed in the mounting block and is in communication with the bore in the mounting block. A clamping sleeve is configured to secure the sensor within the bore in the mounting block. The clamping sleeve defines a bore configured to receive the housing of the sensor and a second keyway in communication with the bore in the clamping sleeve. The second portion of the key is received within the second keyway.

20 Claims, 4 Drawing Sheets

(56) References Cited

U.S. PATENT DOCUMENTS

| | | | | |
|---|---|---|---|---|
| 4,394,993 A | * | 7/1983 | Stamboulian | B60R 22/40 |
| | | | | 242/378.4 |
| 4,953,670 A | | 9/1990 | Chemelewski | |
| 5,544,545 A | | 8/1996 | Sanders et al. | |
| 6,045,267 A | | 4/2000 | Merkelin et al. | |
| 6,222,292 B1 | * | 4/2001 | Smith | F04D 13/06 |
| | | | | 123/149 A |
| 8,065,790 B2 | * | 11/2011 | Clark | G01P 3/487 |
| | | | | 29/709 |
| 9,310,392 B2 | * | 4/2016 | Pan | G01P 1/00 |
| 9,546,692 B2 | * | 1/2017 | Mokhbery | F16D 1/04 |
| 9,921,236 B2 | | 3/2018 | Dalisdas et al. | |
| 10,844,895 B2 | * | 11/2020 | Kluftinger | G01P 1/026 |
| 10,871,501 B2 | * | 12/2020 | Zhou | B60B 27/0068 |
| 2008/0205806 A1 | | 8/2008 | Clark | |
| 2011/0023265 A1 | * | 2/2011 | Singbartl | B60T 8/329 |
| | | | | 16/2.1 |
| 2020/0191820 A1 | * | 6/2020 | Zhou | G01P 1/00 |

FOREIGN PATENT DOCUMENTS

| | | |
|---|---|---|
| DE | 10 2017 113 604 A1 | 12/2018 |
| DE | 10 2019 125 405 A1 | 3/2021 |
| DE | 102019125405.1 | 3/2021 |

* cited by examiner

WHEEL SPEED SENSOR ASSEMBLY WITH STEPPED ALIGNMENT KEY

BACKGROUND OF THE INVENTION a. Field of the Invention

This disclosure relates to wheel speed sensors. In particular, this disclosure relates to a wheel speed sensor assembly employing a stepped key on a housing of a sensor for aligning the sensor within both a mounting block and a clamping sleeve that secures the sensor within the mounting block.

b. Background Art

Conventional vehicles include wheel speed sensors that generate signals indicative of the speed of individual wheels on the vehicle. The wheel speed information is used for a variety of purposes including providing an indication of vehicle speed to the vehicle operator through a dashboard or other interface and in the control of anti-lock braking systems and stability control systems. Referring to FIG. 1, a conventional wheel speed sensor assembly includes an exciter ring 10 (sometimes referred to as a "tone wheel") that is mounted to the wheel hub for rotation with the vehicle wheel, and a wheel speed sensor 12 positioned within an opening 14 in a sensor mounting block 16 on the vehicle axle and spaced from the exciter ring 10. The exciter ring 10 defines a plurality of regularly spaced teeth 18 and rotation of the exciter ring 10 relative to the stationary sensor 12 causes a change in current and/or voltage in sensor 12 as the teeth of ring 10 move past the sensor 12 thereby providing an indication of the change in rotational position of the wheel hub. The sensor 12 is secured within the mounting block 16 using a metal clamping sleeve 20 that is inserted into the opening 14 in the mounting block 16 prior to the sensor 12 and that establishes a spring force between the outer surface of the sensor 12 and the inner surface of the opening 14 to inhibit movement of the sensor 12 relative to the mounting block 16.

The above-described sensor assembly has performed well for its intended purpose. Nevertheless, the assembly has several drawbacks. The wheel speed sensors used in conventional vehicles may be passive sensors or active sensors. In passive sensors, rotation of the exciter ring induces an alternating current in the sensor. In active sensors, rotation of the exciter ring modulates a pre-existing current in the sensor. Passive sensors have a low signal to noise output at low speeds because the slow rotation of the exciter ring does not induce a sufficiently strong current. Passive sensors are also unable to provide information regarding the direction of rotation. For these reasons, active sensors are often preferred in modern vehicles with advanced braking and stability control systems. Active sensors, however, require precise alignment with the exciter ring. In particular, an integrated circuit in the sensor must be aligned tangentially to the rotational path of the exciter ring and active sensors must therefore be precisely positioned within the mounting block. Alignment of the active sensor is particularly difficult in commercial vehicles because looser tolerances on commercial vehicles relative to passenger vehicles can result in relatively large runout of the exciter ring and a relatively large amount of corresponding axial movement in the sensor within the mounting block.

The inventors herein have recognized a need for a wheel speed sensor assembly that will minimize and/or eliminate one or more of the above-identified deficiencies.

BRIEF SUMMARY OF THE INVENTION

This disclosure relates to wheel speed sensors. In particular, this disclosure relates to a wheel speed sensor assembly employing a stepped key on a housing of a sensor for aligning the sensor within both a mounting block and a clamping sleeve that secures the sensor within the mounting block.

A wheel speed sensor assembly in accordance with one embodiment includes a sensor having a housing configured to be received within a bore in a mounting block that positions the sensor such that the sensor is spaced from, and faces, an exciter ring and senses rotation of the exciter ring. The housing extends along a longitudinal axis and defines a key on a radially outer surface. The key has a first portion having a first height and configured to be received within a first keyway that is formed in the mounting block and is in communication with the bore in the mounting block. The key has a second portion having a second height less than the first height. The assembly further includes a clamping sleeve configured to secure the sensor within the bore in the mounting block. The clamping sleeve defines a clamping sleeve bore configured to receive the housing of the sensor and a second keyway in communication with the clamping sleeve bore. The second keyway is configured to receive the second portion of the key.

A wheel speed sensor assembly in accordance with another embodiment includes a sensor having a housing configured to be received within a bore in a mounting block that positions the sensor such that the sensor is spaced from, and faces, an exciter ring and senses rotation of the exciter ring. The housing extends along a longitudinal axis and defines a key on a radially outer surface. The key has a first portion having a first height and configured to be received within a first keyway that is formed in the mounting block and is in communication with the bore in the mounting block. The key has a second portion having a second height less than the first height. The assembly further includes a clamping sleeve configured to secure the sensor within the bore in the mounting block. The clamping sleeve defines a clamping sleeve bore configured to receive the housing of the sensor and a second keyway in communication with the clamping sleeve bore. The second keyway is configured to receive the second portion of the key. The second portion of the key tapers.

A wheel speed sensor assembly in accordance with another embodiment includes a mounting block defining a bore and a first keyway in communication with the bore. The assembly further includes a sensor having a housing configured to be received within the bore in the mounting block to position the sensor such that the sensor is spaced from, and faces, an exciter ring and senses rotation of the exciter ring. The housing extends along a longitudinal axis and defines a key on a radially outer surface. The key has a first portion having a first height and configured to be received within the first keyway in the mounting block. The key has a second portion having a second height less than the first height. The assembly further includes a clamping sleeve configured to secure the sensor within the bore in the mounting block. The clamping sleeve defines a clamping sleeve bore configured to receive the housing of the sensor and a second keyway in communication with the clamping sleeve bore. The second keyway is configured to receive the second portion of the key.

A wheel speed sensor assembly in accordance the present teachings represent an improvement as compared to conventional wheel speed sensors assemblies. In particular, the assembly provides precise, cost-effective alignment of the sensor within the mounting block relative to the exciter ring. The assembly employs a robust key and keyway arrangement between the sensor, clamping sleeve and mounting block that precisely orients the sensor relative to the exciter ring while accommodating movement of the sensor towards and away from the exciter ring. As a result, the assembly facilitates the use of active wheel speed sensors even in commercial vehicles in which looser tolerances result in larger runout of the exciter ring. The key and keyway arrangement between the sensor and clamping sleeve also improves installation by forcing alignment of the sensor and clamping sleeve prior to inserting the sensor into the sleeve as misalignment between the sensor and sleeve becomes increasingly difficult to correct as the sensor is inserted further into the sleeve.

The foregoing and other aspects, features, details, utilities, and advantages of the present teachings will be apparent from reading the following description and claims, and from reviewing the accompanying drawings.

BRIEF DESCRIPTION OF THE DRAWINGS

FIG. 9 is a perspective view of a clamping sleeve of another embodiment of a wheel speed sensor assembly in accordance with the present teachings.

DETAILED DESCRIPTION OF THE INVENTION

Figure 1:
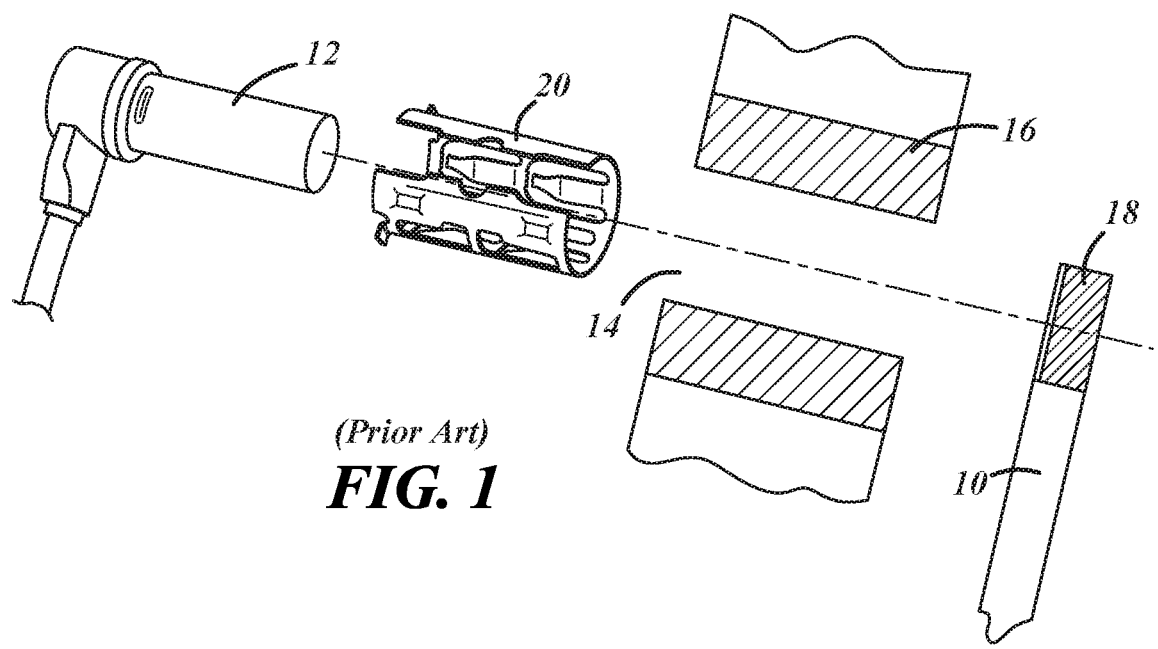
FIG. 1 is an exploded view of a prior art wheel speed sensor assembly.
Figure 2:
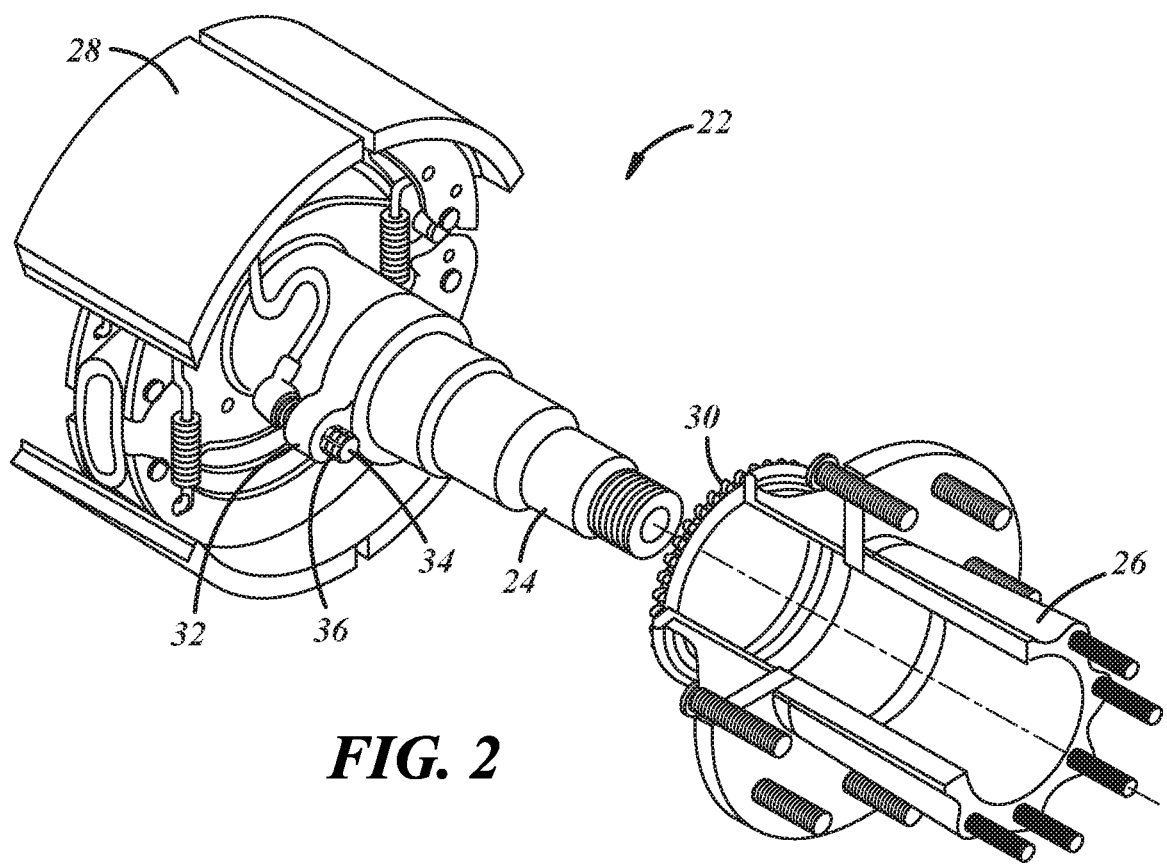
FIG. 2 is a perspective view of a vehicle wheel assembly incorporating a wheel speed sensor assembly in accordance with the present teachings.

Referring now to the drawings wherein like reference numerals are used to identify identical components in the various views, FIG. 2 illustrates a portion of a vehicle wheel assembly 22 incorporating a wheel speed sensor assembly in accordance with the present teachings. Wheel assembly 22 includes an axle 24 and a wheel hub 26 that supports a vehicle wheel (not shown). The wheel hub 26 is rotatably supported on axle 24 by wheel bearings (not shown). Wheel assembly 22 may further include a wheel brake 28 which takes the form of a drum brake in the illustrated embodiment. The operation of wheel brake 28 may be controlled, in part, responsive to signals generated by the wheel speed sensor assembly.

The wheel speed sensor assembly is provided to measure the speed of rotation of the vehicle wheel. The wheel speed sensor assembly includes an exciter ring 30, a sensor mounting block 32, a wheel speed sensor 34 and a clamping sleeve 36.

Exciter ring 30 (sometimes referred to as a "tone wheel") is fixed to hub 26 for rotation therewith. In some embodiments, the exciter ring 30 defines a plurality of metallic teeth. In other embodiments, the exciter ring 30 may comprise a magnetic encoder with a plurality of magnets of alternating polarity supported on the ring 30.

Figure 3:
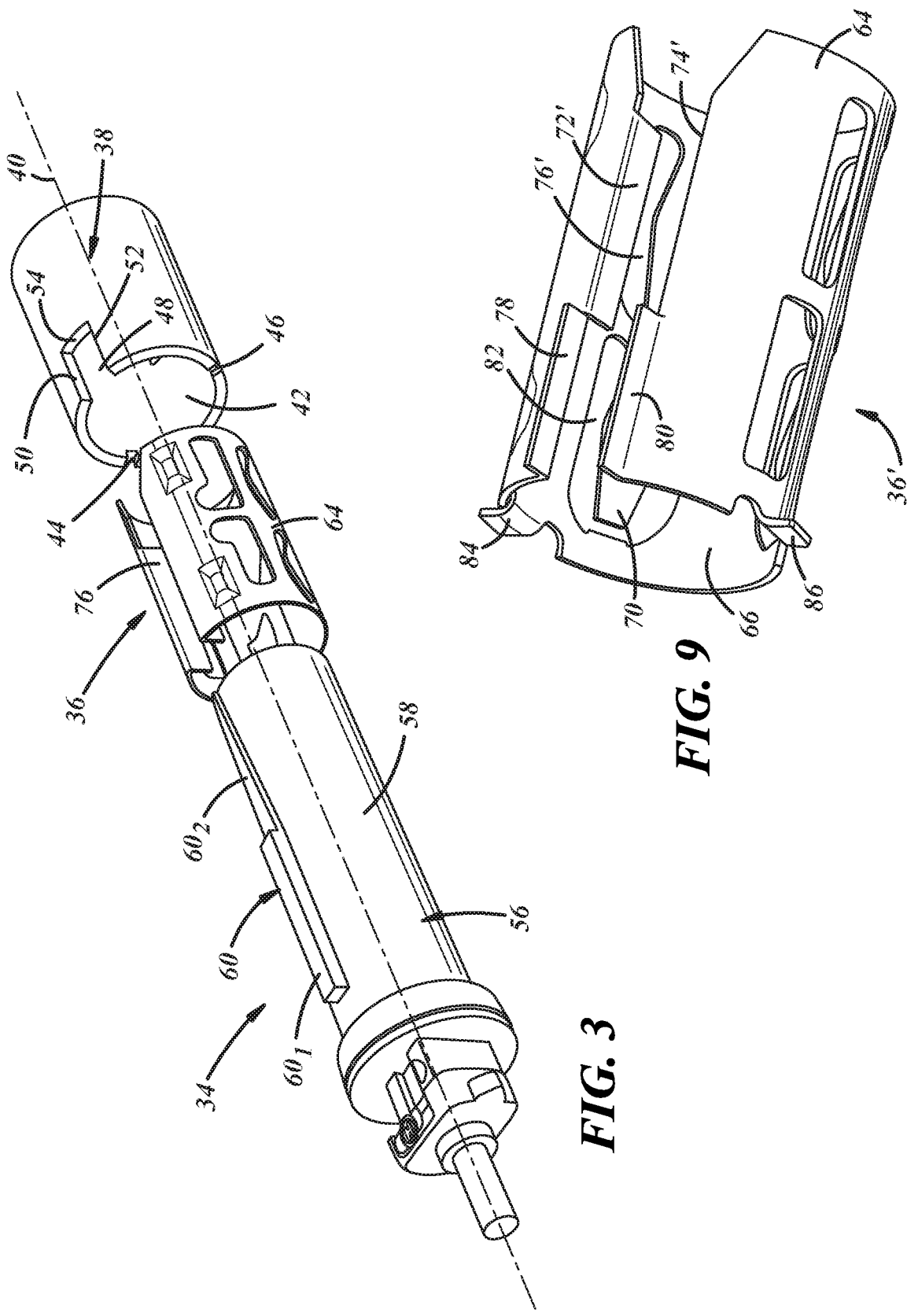
FIGS. 3-4 are exploded perspective views of one embodiment of a wheel speed sensor assembly in accordance with the present teachings.
Figure 4:
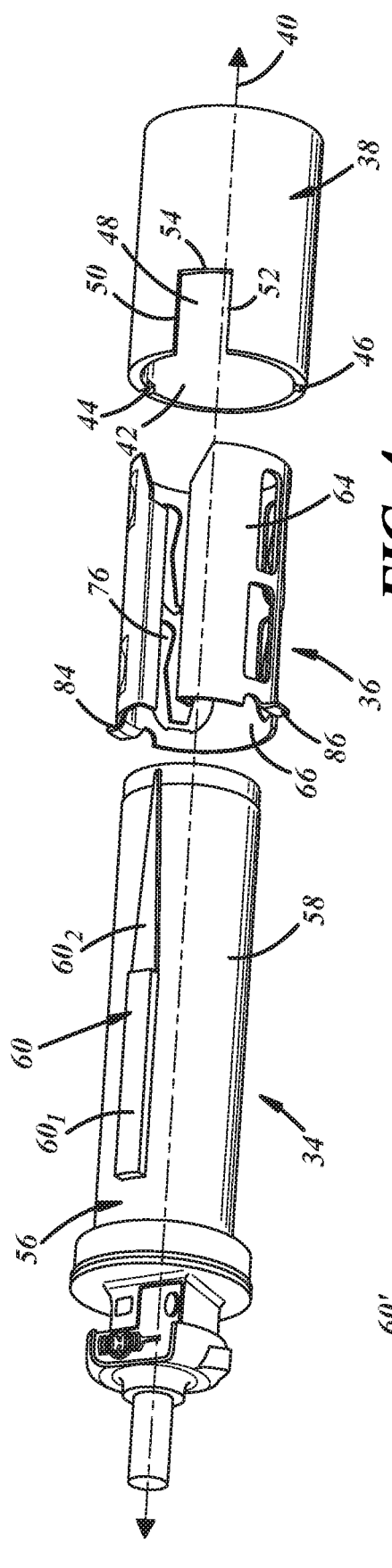

Sensor mounting block 32 is supported on axle 24. Block 32 defines an opening that is configured to receive sensor 34 and positions sensor 34 relative to exciter ring 30 such that sensor 34 is spaced from, and faces exciter ring 30 and senses rotation of exciter ring 30 relative to sensor 34. Referring now to FIGS. 3-4, in one embodiment mounting block 32 may include a bushing 38 configured to be received within the opening in mounting block 32. Bushing 38 is generally cylindrical in shape and disposed about a longitudinal axis 40. Bushing 38 defines a bore 42 configured to receive sensor 34 and clamping sleeve 36. Bushing 38 may also define one or more recesses 44, 46 in an end wall of bushing 38 for a purpose discussed hereinbelow. In the illustrated embodiment recesses 44, 46 are diametrically opposite one another. In accordance with one aspect of the present teachings, bushing 38 defines a keyway 48 in communication with bore 42 for a purpose described below. Keyway 48 extends in a direction parallel to axis 40. Keyway 48 begins at one longitudinal end of bushing 38, but terminates prior to the other longitudinal end of bushing 38 such that keyway 48 is closed at one end. Because keyway 48 extends only part of the way through bushing 38, the structural strength of bushing 38 is not compromised and is also easier to form keyway 48 within existing bushings 48 (or within mounting block 32 generally). Keyway 48 is defined by a pair of opposed circumferential side walls 50, 52 and an end wall 54. Although mounting block 32 includes a bushing 38 in the illustrated embodiment, it should be understood that bushing 38 may be omitted and that a keyway corresponding to keyway 48 can be formed directly within mounting block 32. Further, although a particular form of mounting block is shown in FIG. 2, it should be understood that the configuration of mounting block 32 may vary depending on the type of exciter ring 30, the desired orientation of sensor 34 relative to exciter ring 30 and packaging requirement of nearby vehicle components.

Sensor 34 detects movement of exciter ring 30 and generates a signal indicative of the speed of rotation of the vehicle wheel. Sensor 34 includes a housing 56 that is configured to house a speed measurement instrument (not shown). The instrument may comprise a passive wheel speed sensor that generates signals when current is generated in a wound coil as a result of magnetic induction occurring in response to movement of exciter ring 30. An exemplary passive wheel speed sensor is shown in commonly assigned U.S. patent application Ser. No. 16/220,042, the entire disclosure of which is incorporated herein by reference. The instrument, however, preferably comprises an active wheel speed sensor that generates signals by modulating an existing current as a result of magnetic resistance occurring in response to movement of exciter ring 30. The instrument may, for example, comprise a magneto-resistive integrated circuit formed on a printed circuit board or chip and a magnet that substantially surrounds the board.

Figure 5:
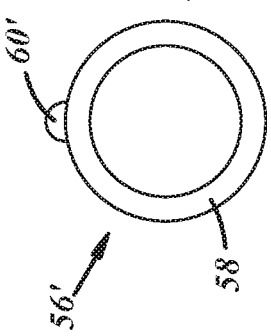
FIG. 5 is a cross-sectional view of a sensor housing of another embodiment of a wheel speed sensor assembly in accordance with the present teachings.

Housing 56 is provided to support and orient the other components of sensor 34. Housing 56 includes a body 58 that extends along and is disposed about axis 40 and is configured to be received within a bore in mounting block 32 such as bore 42 in bushing 38. Housing 56 may be made from conventional metals and metal alloys such as stainless steels. One end of housing 56 facing away from exciter ring 30 may define a connector configured to receive an electrical conductor such as a cable used to transmit signals generated by the speed measurement instrument to a controller and/or other destinations. In other embodiments, however, sensor 34 may transmit signals wirelessly. In accordance with one aspect of the present teachings, housing 56 includes a stepped key 60 on a radially outer surface of a body 58. Key 60 may be coupled to the body 58 through welds, adhesives or other conventional fasteners. Alternatively, key 60 may be integrated with body 58 as a unitary (one-piece) structure. Key 60 extends in a direction parallel to axis 40. Key 60 may have a rectilinear shape and, in particular, may have a rectangular shape as shown in the illustrated embodiment. Referring to FIG. 5, however, in an alternative embodiment a second housing 56' may include a key 60' having a curved surface. For example, key 60' may be substantially semicircular in shape. Referring again to FIGS. 3-4, the keyway in mounting block 32 (e.g. keyway 48 in bushing 38) and the key 60 on housing 56 of sensor 34 preferably have complementary shapes.

Figure 6:
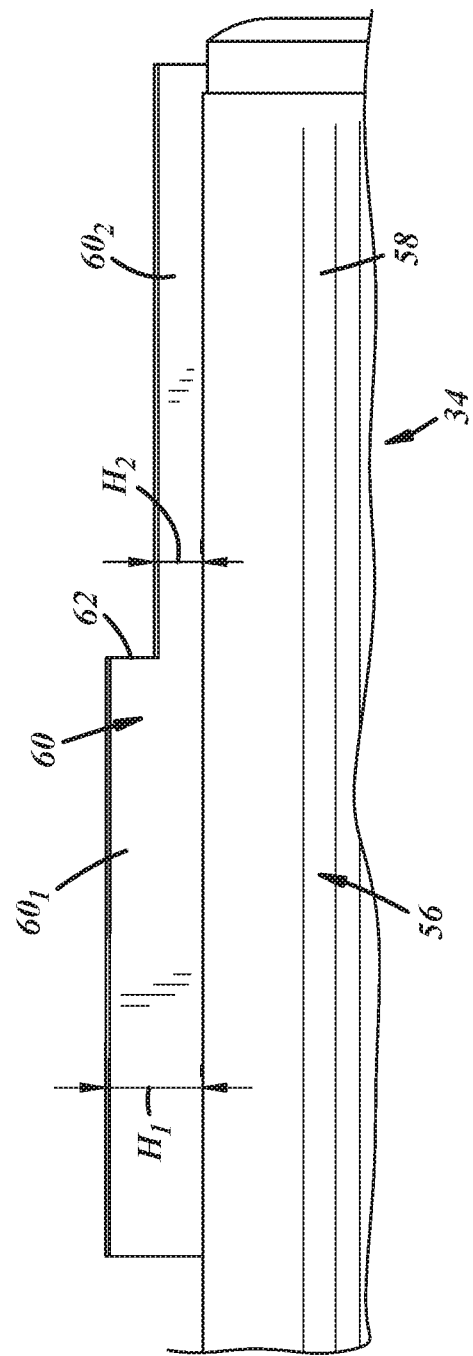
FIG. 6 is a side view of a portion of the sensor of the wheel speed sensor assembly of FIGS. 3-4.

Key 60 includes two portions 601, 602 having different heights. Referring to FIG. 6, portion 601 has a height $H_1$ while portion 602 has a height $H_2$ that is less than the height $H_1$ of portion 601. Portions 601, 602, therefore define a step or shoulder 62. Referring again to FIGS. 3-4, portion 601 is configured to be received within keyway 48 in bushing 38 of mounting block 32. Shoulder 62 is configured to engage end wall 54 of keyway 48 as sensor 34 is move along axis 40 into bushing 38 and mounting block 32. The width of keyway 48 between side walls 50, 52 is greater than the width of portion 601 of key 60 to facilitate movement of sensor 34 into bushing 38 and mounting block 32 and to allow for limited rotation of sensor 34. Portion 602 is configured to be received by clamping sleeve 36 as discussed below. In the illustrated embodiment, portion 602 tapers moving in a direction away from portion 601 of key 60 to facilitate insertion of sensor 34 into clamping sleeve 36. In the illustrated embodiment, portion 602 tapers along the entire length of portion 602. It should be understood, however, that portion 602 may be configured to such that only a part, or even no part, of portion 602 tapers.

Figure 8:
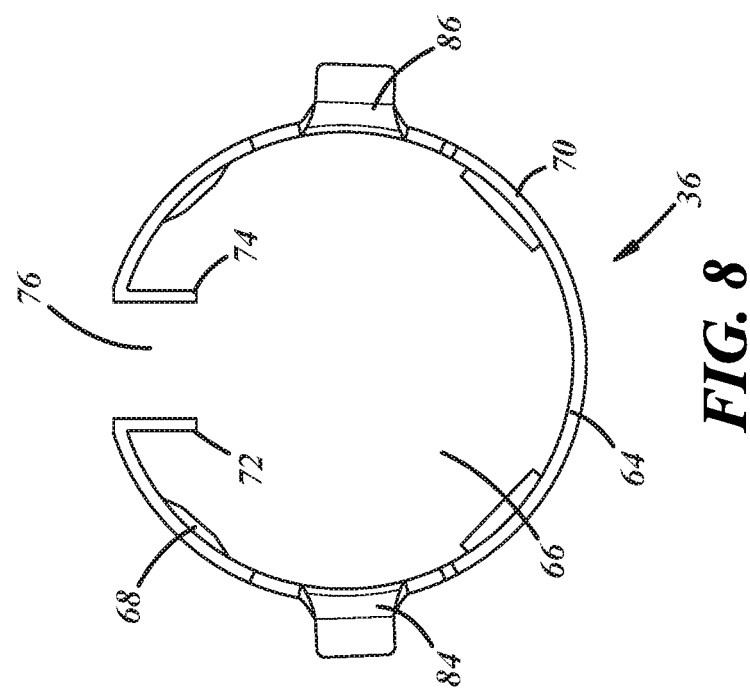
FIG. 8 is a cross-sectional view of the clamping sleeve of the wheel speed assembly of FIGS. 3-4.
Figure 7:
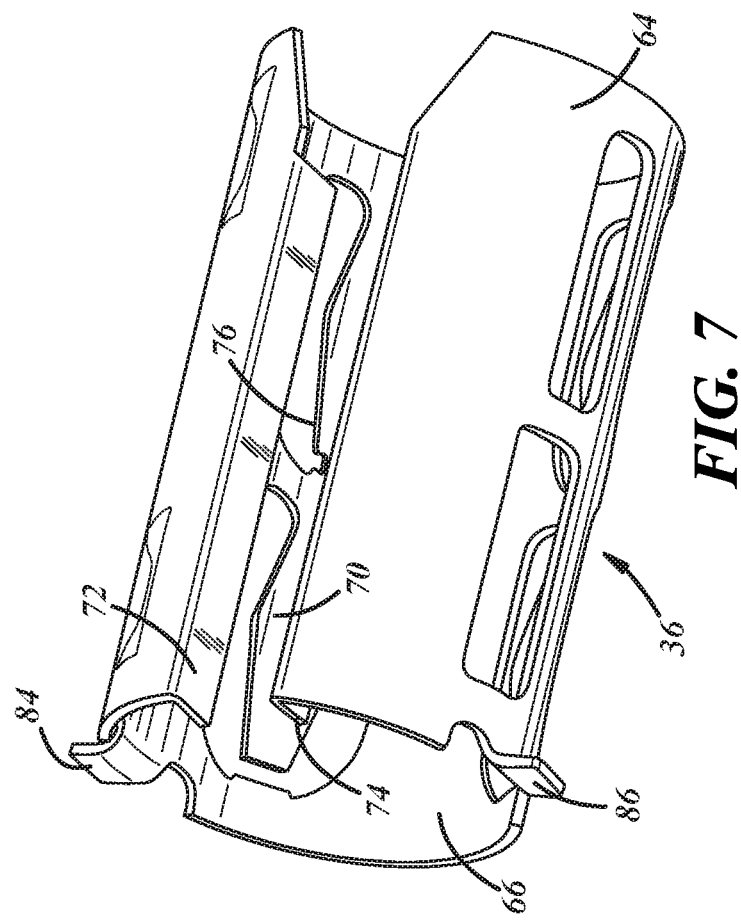
FIG. 7 is a perspective view of the clamping sleeve of the wheel speed sensor assembly of FIGS. 3-4.

Clamping sleeve 36 is provided to secure sensor 34 within mounting block 32. Sleeve 36 establishes a friction fit between the outer surface of housing 56 of sensor 34 and the inner surface of mounting block 32 (e.g., the inner surface of bushing 38) to inhibit movement of sensor 34 relative to mounting block 32. Sleeve 36 may be made from conventional metals and metal alloys such as spring steels. Referring now to FIGS. 7-8, sleeve 36 includes a body 64 that defines a clamping sleeve bore 66 configured to receive the body 58 of housing 56 of sensor 34. Body 64 is formed and cut in a pattern to define a plurality of radially inwardly extending protrusions 68 and a plurality of tongues 70 that are positioned diametrically opposite the protrusions 68 and biased to a predetermined position. During assembly of sensor 34 and clamping sleeve 36 within mounting block 32, tongues 70 deflect from their predetermined positions. Once assembly is complete, the biasing force in tongues 70 inhibits relative movement between sensor 34 and mounting block 32. The spring force generated by tongues 70 is set to generally inhibit rotational movement of sensor 34 within mounting block 32 following installation, but to allow limited and temporary axial displacement within mounting block 32 upon application of a force to sensor 34 resulting from contact with exciter ring 30 during operation due to wheel end runout in order to prevent damage to sensor 34. Tongues 70 are arranged in specific patterns to provide a uniform distribution of the friction force between the sensor 34 and mounting block 32 as the sensor 34 is inserted into mounting block 32. Although the illustrated embodiment illustrates a particular configuration for body 64, protrusions 68 and tabs 70, it should be understood that the configuration of body 64, protrusions 68 and/or tabs 70 may vary.

In accordance with one aspect of the present teachings, sleeve 36 further includes a pair of circumferentially spaced alignment tabs 72, 74 defining a keyway 76 in communication with bore 66 and configured to receive portions 601, 602 of key 60 on sensor 34. The use of key 60 and keyway 76 facilitates alignment of the sensor 34 and sleeve 36 prior to assembly because rotating sensor 34 relative to sleeve 36 to correct any misalignment becomes increasingly difficult as sensor 34 is inserted further into bore 66 of sleeve 36. Keyway 76 extends parallel to axis 40. The width of keyway 76 between tabs 72, 74 is greater than the width of key 60 to facilitate movement of sensor 34 into sleeve 36 and to allow for limited rotation of sensor 34 relative to sleeve 36. The taper of portion 602 of key 60 also facilitates proper alignment and insertion of key 60 with keyway 76. As shown in FIGS. 7-8, tabs 72, 74 preferably extend radially inwardly into bore 66 of sleeve 36. Because tabs 72, 74 extend radially inwardly, mounting block 32 may include a relatively short, closed keyway (such as keyway 48 in bushing 38) as opposed to having a relatively long keyway (that may even extend through the entire length of mounting block 32) resulting in improvements in structural integrity in mounting block 32 and easier modification to existing mounting block structures. In embodiments in which the mounting block 32 has a longer keyway or an open-ended keyway, tabs 72, 74 could alternatively extend radially outwardly. Referring to FIG. 9, in yet another embodiment, a clamping sleeve 36' may include a pair of circumferentially spaced, radially inwardly extending tabs 72', 74' extending along a first longitudinal portion of sleeve 36' and a pair of circumferentially spaced, radially outwardly extending tabs 78, 80 extending along a second longitudinal portion of sleeve 36'. Tabs 72', 74' extend into bore 66 of sleeve 36' and define a keyway 76' configured to receive portion 602 of key 60 in a manner similar to tabs 72, 74 in sleeve 36. Tabs 78, 80 extend into keyway 48 of bushing 38 and define a keyway 82 configured to receive portion 601 of key 60. Tabs 78, 80 are configured to be received within the keyway in mounting block 32 such as keyway 48 in bushing 36 such that each of tabs, 78, 80 is disposed between one side wall 50, 52 of keyway 48 and a corresponding side wall of portion 601 of key 60.

Referring again to FIGS. 7-8, body 64 of clamping sleeve 36 may further include one or more tabs 84, 86 at one longitudinal end of body 64. Tabs 84, 86 are configured to be received within corresponding recesses in mounting block 32 such as recesses 44, 46 in bushing 38 in order to align clamping sleeve 36 relative to mounting block 32 and to align keyway 76 in clamping sleeve 36 with the corresponding keyway in mounting block 32 such as keyway 48 in bushing 36.

A wheel speed sensor assembly in accordance the present teachings represent an improvement as compared to conventional wheel speed sensors assemblies. In particular, the assembly provides precise, cost-effective alignment of the sensor 34 within the mounting block 32 relative to the exciter ring 30. The assembly employs a robust key 60 and keyway 48 and 76 or 76' arrangement between the sensor 34, clamping sleeve 36 or 36' and mounting block 32 that precisely orients the sensor 34 relative to the exciter ring 30 while accommodating movement of the sensor 34 towards and away from the exciter ring 30. As a result, the assembly facilitates the use of active wheel speed sensors even in commercial vehicles in which looser tolerances result in larger runout of the exciter ring 30. The key 60 and keyway 76 or 76' arrangement between the sensor 34 and clamping sleeve 36 or 36' also improves installation by forcing alignment of the sensor 34 and clamping sleeve 36 or 36' prior to inserting the sensor 34 into the sleeve 36 or 36' as misalignment between the sensor 34 and sleeve 36 or 36' becomes increasingly difficult to correct as the sensor 34 is inserted further into the sleeve. 36 or 36'.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. A wheel speed sensor assembly, comprising:
   a sensor having a housing configured to be received within a bore in a mounting block that positions the sensor such that the sensor is spaced from, and faces, an exciter ring and senses rotation of the exciter ring, the housing extending along a longitudinal axis and defining a key on a radially outer surface, the key having a first portion having a first height and configured to be received within a first keyway that is formed in the mounting block and is in communication with the bore in the mounting block and a second portion having a second height less than the first height; and,
   a clamping sleeve configured to secure the sensor within the bore in the mounting block, the clamping sleeve defining a clamping sleeve bore configured to receive the housing of the sensor and a second keyway in communication with the clamping sleeve bore, the second keyway configured to receive the second portion of the key.

2. The wheel speed sensor assembly of claim 1 wherein the second keyway is further configured to receive the first portion of the key.

3. The wheel speed sensor assembly of claim 1 wherein the key has a rectilinear shape.

4. The wheel speed sensor assembly of claim 3 wherein the key has a rectangular shape.

5. The wheel speed sensor assembly of claim 1 wherein the key has a curved surface.

6. The wheel speed sensor assembly of claim 1 wherein the key is coupled to a body of the housing.

7. The wheel speed sensor assembly of claim 1 wherein the key and a body of the housing form a unitary structure.

8. The wheel speed sensor assembly of claim 1 wherein the clamping sleeve includes a first and second alignment tabs defining the second keyway, the first and second alignment tabs circumferentially spaced and extending in a radial direction.

9. The wheel speed sensor assembly of claim 8 wherein at least a portion of each of the first and second alignment tabs extends radially inwardly into the clamping sleeve bore.

10. The wheel speed sensor assembly of claim 8 wherein at least a portion of each of the first and second alignment tabs extends radially outwardly and is configured to be received within the first keyway in the mounting block.

11. The wheel speed sensor assembly of claim 8 wherein a first portion of each of the first and second alignment tabs extends radially inwardly into the clamping sleeve bore and a second portion of each of the first and second alignment tabs extends radially outwardly and is configured to be received within the first keyway in the mounting block.

12. A wheel speed sensor assembly, comprising:
    a sensor having a housing configured to be received within a bore in a mounting block that positions the sensor such that the sensor is spaced from, and faces, an exciter ring and senses rotation of the exciter ring, the housing extending along a longitudinal axis and defining a key on a radially outer surface, the key having a first portion having a first height and configured to be received within a first keyway that is formed in the mounting block and is in communication with the bore in the mounting block and a second portion having a second height less than the first height; and,
    a clamping sleeve configured to secure the sensor within the bore in the mounting block, the clamping sleeve defining a clamping sleeve bore configured to receive the housing of the sensor and a second keyway in communication with the clamping sleeve bore, the second keyway configured to receive the second portion of the key
    wherein the second portion of the key tapers.

13. The wheel speed sensor assembly of claim 12 wherein the second portion of the key tapers moving in a direction away from the first portion of the key.

14. The wheel speed sensor assembly of claim 12 wherein only a part of the second portion of the key tapers.

15. The wheel speed sensor assembly of claim 12 wherein the clamping sleeve includes a first and second alignment tabs defining the second keyway, the first and second alignment tabs circumferentially spaced and extending in a radial direction.

16. The wheel speed sensor assembly of claim 15 wherein at least a portion of each of the first and second alignment tabs extends radially inwardly into the clamping sleeve bore.

17. The wheel speed sensor assembly of claim 15 wherein at least a portion of each of the first and second alignment tabs extends radially outwardly and is configured to be received within the first keyway in the mounting block.

18. The wheel speed sensor assembly of claim 15 wherein a first portion of each of the first and second alignment tabs extends radially inwardly into the clamping sleeve bore and a second portion of each of the first and second alignment tabs extends radially outwardly and is configured to be received within the first keyway in the mounting block.

19. A wheel speed sensor assembly, comprising:
    a mounting block defining a bore and a first keyway in communication with the bore;
    a sensor having a housing configured to be received within the bore in the mounting block to position the sensor such that the sensor is spaced from, and faces, an exciter ring and senses rotation of the exciter ring, the housing extending along a longitudinal axis and defining a key on a radially outer surface, the key having a first portion having a first height and configured to be received within the first keyway in the mounting block and a second portion having a second height less than the first height; and, a clamping sleeve configured to secure the sensor within the bore in the mounting block, the clamping sleeve defining a clamping sleeve bore configured to receive the housing of the sensor and a second keyway in communication with the clamping sleeve bore, the second keyway configured to receive the second portion of the key.

20. The wheel speed sensor assembly of claim 19 wherein the first keyway is closed at one end.

\* \* \* \* \*